Oct. 6, 1942.  F. JEHLE ET AL  2,297,706
TEMPERATURE CONTROLLER
Filed Aug. 3, 1940    3 Sheets-Sheet 1
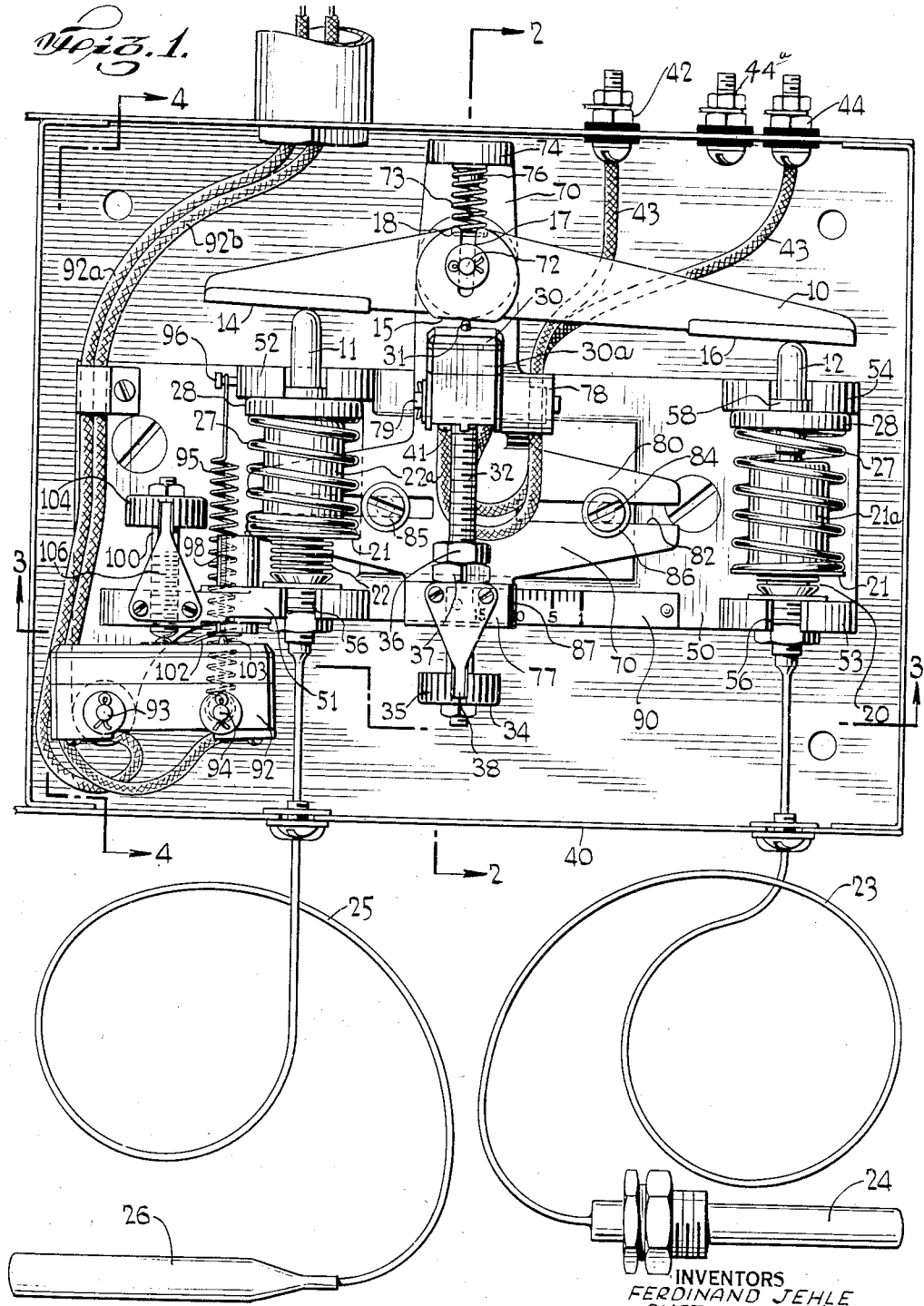
INVENTORS
FERDINAND JEHLE
AUSTIN O. ROCAE JR
BY
ATTORNEYS Oct. 6, 1942.  F. JEHLE ET AL  2,297,706
TEMPERATURE CONTROLLER
Filed Aug. 3, 1940  3 Sheets-Sheet 2
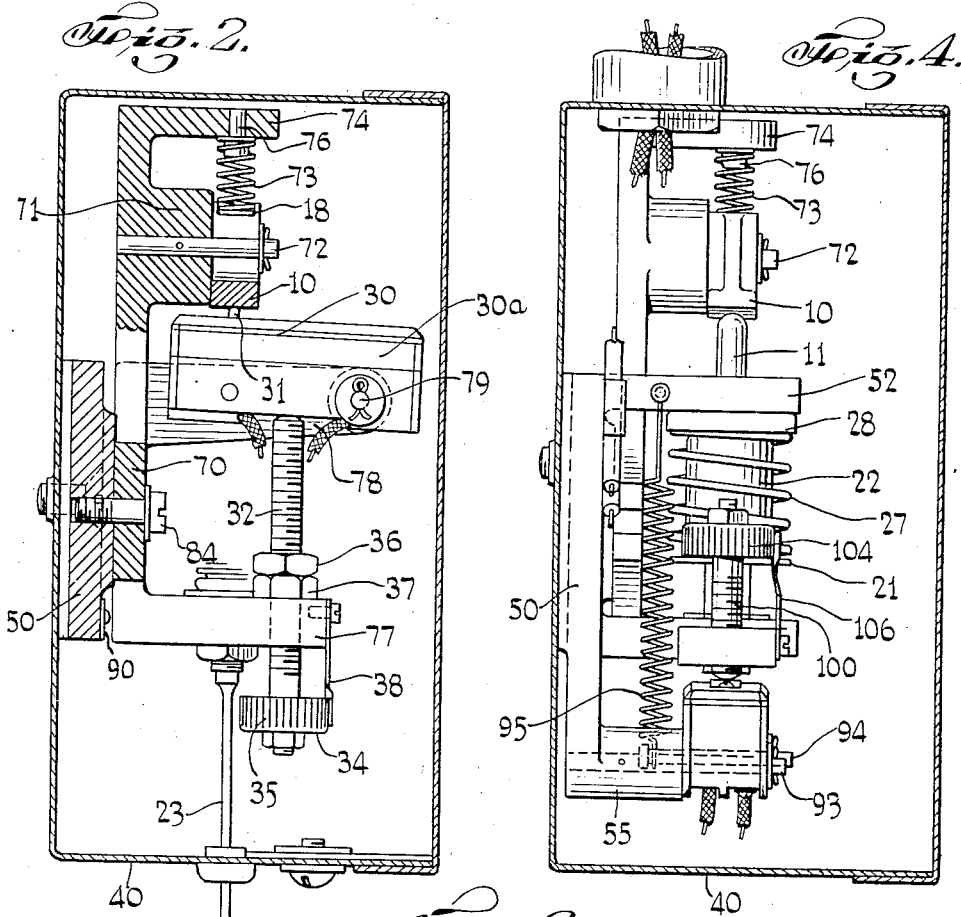
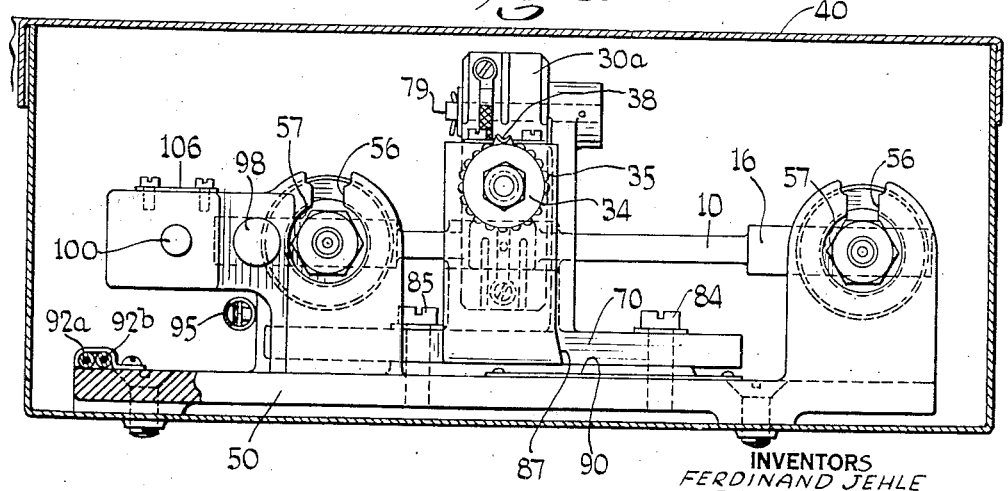
INVENTORS
FERDINAND JEHLE
AUSTIN O. ROCHE, JR.
ATTORNEYS Patented Oct. 6, 1942

2,297,706

UNITED STATES PATENT OFFICE 2,297,706

TEMPERATURE CONTROLLER

Ferdinand Jehle, New Canaan, and Austin O. Roche, Jr., Stamford, Conn., assignors to Hoffman Specialty Co., Inc., Stamford, Conn., a corporation of Illinois Application August 3, 1940, Serial No. 350,638

15 Claims. (Cl. 200—83)

This invention relates to a temperature control device. More particularly it relates to an apparatus for controlling and varying one temperature in a predetermined ratio with the variation of another temperature.

Control devices of the type described herein may be used in controlling the temperature of the supply of water to hot water heating systems, basing the control upon the variations of the outdoor temperatures, or may be used in air conditioning cooling systems to control the inside cooling with reference to outside temperature variations, or for controlling the heat output of hot air or steam heating systems by variations of outside temperature, or for controlling the temperature of one bath with reference to another, and in various other ways.

It is the object of the invention to provide a control device of the type described and illustrated herein which will permit by adjustment an infinite variation of the ratio at which the basic and controlled temperatures may vary. In most cases it has heretofore been impossible to properly adjust the setting of the relevant elements of the control device to give the desired ratio in rate variation of the two temperatures. Although an accurate ratio setting may not be important when the variation in basic temperature is small, accuracy of ratio setting becomes proportionately more important with every increase in temperature variation. For example, if the correct ratio setting were 4:5 and the actual setting were 5:5 the controlled temperature would be one degree off for a five degree variation of the basic temperature. However, if the variation of the basic temperature was 50° instead of 5° the erroneous ratio setting would throw the controlled temperature off 10°.

The object of our invention is to provide a temperature responsive control device of the lever type which is provided with a simple means for varying and adjusting the ratio in rate variation of the basic and control temperatures.

A further object of this invention is to provide a temperature responsive control device with simple means for making an infinite number of adjustments to vary the ratio in rate variation of the basic and controlled temperatures.

Another object of this invention is to provide a temperature responsive control device having means for indicating the ratio in rate variation of the basic and control temperature settings at any particular time.

A still further object of this invention is to provide a temperature responsive control device having means for the adjustment of the temperature at which the control switch becomes operative, as well as means for varying the ratio in rate variation of the basic and controlled temperatures.

Other objects and advantages of our invention will become apparent from the disclosures made hereinafter.

We have found that the ratio in rate variation of the basic and controlled temperatures can readily be varied by providing means for readily adjusting the ratio of the distances on the lever arm between the switch and each of the temperature responsive expansion elements normally used in the operation of control devices of this type.

In the accompanying drawings which illustrate one form of construction embodying features of our invention, Figure 1 is a front view of a simple lever type control device, having two expansion elements showing the relative positions of the temperature responsive expansion elements, a pressure responsive electric switch and the lever arm;

Figure 2 is a vertical section on the line 2—2 of Figure 1 showing the position of the adjusting screw and switch in relation to the lever arm;

Figure 3 is a horizontal section on the line 3—3 of Figure 1 showing the scale and pointer;

Figure 4 is a vertical section along the plane of the line indicated by 4—4 of Figure 1.

Figure 5:
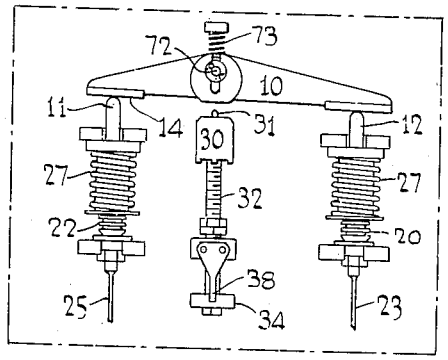
Figures 5, 6, 7 and 8 are diagrammatic views illustrating the position of the various parts of the controller under different operating conditions.

The apparatus of our invention includes in general a lever arm 10 mounted for pivotal and vertically slidable movement, two temperature responsive expansion elements 20 and 22 mounted in spaced relationship and adaptable to effect the position of the lever arm, a pressure responsive electrical switch 30 laterally movable by adjustment and adaptable for actuation by pressure exerted by the lever arm.

The control device may be of any suitable construction. For example, most of the operating parts, as shown in Figure 1, may be enclosed in a housing 40 in which are positioned temperature responsive expansion elements 20 and 22, mounted in fixed space relationship on a frame 50, a pressure responsive switch 30, positioned between the expansion elements and mounted on a laterally slidable support 70, and a lever arm mounted for pivotal and vertical movement about a fixed point 72 on support 70.

The temperature responsive expansion elements may be of any suitable design. They may, for example, be of the simple cylindrical bellows type, such as those indicated in the drawings which are illustrated as connected to bulbs 24 and 26 by tubing 23 and 25, and are actuated by the expansion or contraction of a temperature responsive fluid with which these elements are filled. The expansion elements, or bellows of elements 20 and 22 are further provided with cylindrical extensions or plungers 11 and 12 fastened to their tops or extreme ends. These extensions at times engage lever arm 10 and act to move the arm about its pivot.

The frame 50 on which the expansion elements are mounted is provided with five brackets 51, 52, 53, 54 and 55, the first four of these being positioned in spaced relationship to one another with bracket 52 overlying 51 and bracket 54 overlying 53. These brackets are each provided with slits 56 and collar seats 57. When the frame 50 and the expansion elements are assembled, the lower end of expansion element 20 is firmly fixed in seat 57 of bracket 54, while the cylindrical extension 12 and the upper portion of the bellows are free to move axially. The cylindrical extension passes through a collar 58 provided on spring cap 28, and seated in seat 57 of bracket 54. The spring 27, which encircles the upper portion of the bellows and abuts the cap 28 at one end, abuts and presses down a shoulder 21 of the bellows has 21a which covers the bellows 20, thereby opposing expansion of the bellows 20 and tending to return the plunger 12 to retracted position when the contraction of the fluid in the bulb 24 will permit. The other expansion element 22 is similarly held in position in the seats of brackets 51 and 52 and similarly returned to unexpanded position.

The lever 10 may be of any suitable design provided it is of sufficient length to overlie the fulcrum and the ends of the plungers 11 and 12 in all possible adjustments of the device. In the illustrated example the lever is slightly longer than the distance between the plungers 11 and 12 to permit a lateral shifting of the lever and still have it make contact with these plungers under certain conditions. The lever may be provided with flat surfaces such as 14, 15 and 16 for contacting the plungers 11 and 12 and the control switch 30. In the particular embodiment illustrated, the points of contact are the tops of the extension cylinders 11 and 12 and the top of the button 31 of the pressure responsive switch 30. The lever is further provided with a slot 17 and a seat or recess 18. The slot 17 permits the lever to be rotatable and vertically movable about a fixed pin 72 mounted on the slidable frame 70. This pin supports the lever arm on the shoulder 71 and confines the motion of the lever to a single plane. The recess 18 of the lever 10 serves as a seat for a spring 73 which abuts bracket 74 on the slidable frame 70 and is held in place by a pin 76. The spring 73 presses the lever arm 10 downwardly and tends to force it to rest on one or both of the plungers 11 and 12 or the switch button 31.

The pressure responsive switch 30 may be of any suitable design; for example, as illustrated in Figures 1 and 2, it may be encased in an oblong non-conducting container 30a with a pressure responsive button 31 protruding through the top on one end and with the other end hinged to bracket 78 by pin 79. The switch container 30a is adjusted by means of screw 32, which passes through and threadably engages bracket 77 on the slidable frame 70. By turning knob 34 of the adjusting screw the end of the switch with the protruding button 31 can be raised or lowered relative to the position of the lever 10 depending upon the direction in which the knob is turned. The knob is provided with notches 35 which coooperate with a spring pointer 38 mounted on bracket 77 frictionally engaging notches in the knob 34 to indicate the setting and to prevent the adjusting screw from slipping when once it has been set. Lock nuts 36 and 37 are provided on the adjusting screw above bracket 77 to prevent the adjusting screw from being turned too low when once the correct setting has been made. Terminals 41 of the switch 30 are connected with terminals 42 and 44 on the wall of the control box 40 by means of insulated wire 43. The terminals 42 and 44 are mounted on but insulated from casing 40. Connections to the apparatus or electrical circuit to be controlled by the controller are made at the terminals 44 and 44a through the source of power (not shown) which in turn is connected across terminals 42 and 44a.

The slidable frame or support 70, on which both switch 30 and lever arm 10 are mounted by means of brackets 71, 74 and 78, is provided with laterally extending tongues 80 having laterally extending slits 82. These slits permit the support 70 to be slidably mounted on base frame 50 by means of bolts 84 and 85. These bolts have heads, or are provided with washers 86 which abut the surface of support 70 and are threadably engaged with base support 50, so that by loosening the bolts 84 and 85 the support 70 and parts mounted thereon can be slid to the right or left relative to the base support 50 and parts mounted thereon, to change the position of the lever 10 and switch button 31 relative to the plungers 11 and 12 to change the adjustment of the controller.

The base of bracket 77 is provided with a sloping side wall 87 which acts as a pointer on the scale 90, which is fastened along the bottom edge of fixed base 50, so that by noting the position of the edge 87 on the scale 90 the relative setting of the device can be read.

The embodiment of our control device illustrated in the drawings, is provided with a pressure responsive switch 92 which is actuated by variations in expansion of one of the expansion elements, in this case it is bellows 22, to override the controls which are governed by the switch 30. This switch 92 is also enclosed in an oblong casing of non-conducting material which is rotatably hinged at one end to bracket 55 by pin 93 and controls a circuit carried by the wires 92a and 92b, which override the apparatus controlled by the circuit of wires 43. A pin 94 protruding from the side of the other end of the switch casing is fastened to spring 95 which is fastened at its other end to pin 96 protruding from bracket 52. This spring tends to pull the free end of the switch 92 up to engagement with a plunger rod 98 slidably positioned in bracket 51 and engaging the lower surface of shoulder 21 of the upper movable portion of bellows hat 22a. The set screw 100 which passes through and threadably engages bracket 51 is adaptable for engaging the top of the switch 92 and counteracting the force of spring 95 when the expansion of bellows 22 has reached a certain point. Leaf spring 102 overlies the pressure responsive button 103 which actuates the switch 92. The spring also serves to counteract the weight of the plunger rod 98. The set screw 100 is similar in design to set screw 32 and is also provided with a corrugated knob 104 which cooperates with a pointer 106 mounted on bracket 51. By adjustment of the set screw 100 the switch 92 can be adjusted to bring the entire apparatus controlled by the switch 30 into or out of operation when the outside temperature goes above or below a predetermined figure.

The novel feature of the control device of our invention resides in the provision, in a combination such as described hereinabove, of means for varying the adjustment of the lever arm ratio an infinite number of steps. Such means, for example, may consist of a laterally movable support for the pressure responsive switch which is actuated by the lever arm. In the illustrated embodiment the support is slidably mounted at base frame 50 and carries the lever arm 10 as well as the switch 30 and switch set screw 32. The lever arm ratio or the ratio of the distance between the axes of the cylindrical extensions or plungers 11 and 12 and the pressure responsive switch actuated button 31 can therefore be varied an infinite number of steps by loosening screws 84 and 85, and sliding the switch support frame 70 to the right or left a predetermined distance relative to the fixed support 50. This distance is readily visible on scale 90 which is attached to the base of the stationary frame 50. After the setting has been made the screws 84 and 85, can again be tightened to hold the parts in the relative setting desired to maintain the lever arm ratio fixed until a change is desired. When such change is made, the screws or bolts 84 and 85 can again be loosened and the support slid in either direction to the desired extent. The laterally slidable movement of the support is not limited by any set steps or regulated stages and can therefore be set at an infinite number of points.

When the control device is set for operation the bulbs 24 and 26 are exposed to the respective heat sources, the one bulb being exposed to the source that is to be used as a standard and the other to the heat source of the material which is to be regulated and varied with reference to the standard in accordance with a predetermined ratio. The temperature to which the bulbs 24 and 26 are exposed determines the amount of expansion of the respective fluids in the bulbs and the tubing connected thereto and the expansion bellows and therefore the height to which the respective extension cylinders or plungers 11 and 12 are projected above the brackets 52 and 54 on expansion or contraction of the fluid in the bulbs. If the temperatures affecting expansion of the bellows are sufficiently high, the tops of the extension cylinders or plungers 11 and 12 will be so high that if a line were drawn connecting these two points, it would lie above the top of the switch button 31 which actuates the pressure responsive switch, or at least above the top of the button when the button has been depressed into the position where it closes the switch. When the bellows are expanded to this degree the lever arm rests solely on the cylindrical extensions 11 and 12, or, at most, rests on these extensions and presses down on button 31 insufficiently to close the switch 30. Now if the temperature to which the bellows 22 responds decreases, the bellows will contract, causing extension cylinder 11 to disengage from lever 10. This permits the lever arm to rest on extension cylinder 12 and actuating button 31 of pressure responsive switch 30. This allows the force exerted on the lever arm 10 by the spring 73 to close the switch 30. If thereafter the temperature affecting the expansion bellows 20 is increased sufficiently, the lever arm will be raised at that end until it disengages button 31 and re-engages cylindrical extension 11. In this position switch 30 is again open. Switch 30 can also be closed if the bellows 20 contracts sufficiently to permit the lever arm to rest on extension 11 and button 31. It is therefore apparent that a decrease in the temperature causing the contraction of either bellows 20 or 22 has a tendency to close the switch 30, while an increase in the temperature causing either bellows to expand tends to open the switch.

As has been previously stated, the control mechanism of this invention is particularly suitable for controlling and raising one temperature in relation to the variation of another. Apparatus of this type is especially useful in controlling the supply of water to a hot water heating system whose temperature varies in accordance with a predetermined ratio with that of the outdoor temperatures. The mechanism may also be used to control the discharge temperature of a hot air furnace, basing the regulation on outdoor temperature. The device can also be used in a very similar manner in cooling systems of all kinds. The mechanism, however, is not limited to uses in systems of this type. It can, for example, be used in manufacturing processes where the temperature of a material, such as, for example, a bath of liquid, must be changed or varied in accordance with the temperature of some other medium. Furthermore, the mechanism also finds use to vary the temperature of an object not according to the temperature change of some other source, but according to the percentage to which some other object is heated to a certain temperature. For example, it could be used to maintain a bath of liquid at a specific temperature, for example 100°, when a certain rod of metal at some other location is heated to a temperature of, for example, 500°, for a certain distance of its length. Then if the rod is heated to 500° for double the distance, it might be desirable to have the temperature of the bath increased proportionately. Many other uses for a control device of this type will become apparent to those skilled in the art.

In order to illustrate clearly how the opening and closing of the switch 30 can be utilized, the application of the control device to a hot water heating system will be explained. If the switch 30 is electrically connected to a suitable motor operated control valve through which water from a boiler is supplied to a heating system, the valve can be made to open and close to control the temperature of the water in the circulating system in which the bulb 24 is immersed in accordance with vibrations in the outdoor temperature to which bulb 26 is exposed. The control device can be set for any radiator heat emission rate and outside design temperature within reason. The initial setting is normally made at the factory in accordance with the specifications received from the contractor. The relative distances of switch 30 from the outside and water temperature responsive bellows 22 and 20 or the plungers 12 and 11 actuated thereby determine the correct setting and are visibly indicated by the numbers on the small brass scale 90. After having once been set, for example, at the equivalent of 200 B. t. u. per square feet per hour and a design temperature of 0° F. outside, the control device will operate to deliver supply water to the radiators at the proper temperature and will do this job faithfully and correctly. If, however, the heat loss of a building is not figured accurately, or the radiation was not put in as calculated, the temperature of the house will not be correct and readjustment of the lever arm ratio will be necessary. In some instances this can be taken care of by adjusting the screw 32 controlled by knob 34. However, if it is found that knob 34 can be adjusted so that the house temperature is correct at one outside temperature but incorrect when the outside temperature changes, then the setting of the lever arm ratio is wrong and the ratio arm adjustment of lever 10 to the plungers 11 and 12 must be changed. This adjustment can be made by loosening screws 84 and 85, positioned in slots 82, of tongue 80, of frame 70, and laterally shifting the frame holding the switch and lever arm to a predetermined distance to the right or left, depending upon the lever arm ratio desired. The distance and direction in which the frame is shifted is readily ascertainable in accordance with the method disclosed in the copending application Serial No. 350,637, filed August 3, 1940. After the support has been adjusted to give the proper lever arm ratio, the screws 84 and 85, can again be tightened and the screw 32 adjusted so that the switch will become operative at specific outdoor temperatures. The switch 92 which is responsive to the expansion and contraction of bellows 22 can be set with the aid of adjusting screw 100 to start up or shut down the entire heating system at any critical outside temperature. For example, in the control of a hot water heating system if the outside temperature is above 65° F. it is usually not necessary to provide any heat inside. If the setting of screw 100 is such that switch 92 rests against the end of screw 100 when the temperature of bulb 26 is 65° F., then the pressure of plunger 98 on the pressure responsive button of switch 92 is relieved, thus permitting switch 92 to open, cutting the entire heating system out of operation during the time the outside temperature is above 65° F.

The operation of our control device applied to a hot water heating system, assuming that the switch 92 calls for such heat, is illustrated in the diagrammatic Figures 5, 6, 7 and 8.

In Figure 5 the hot water temperature effecting the expansion of bellows 20 is high enough that no heat is required and the plungers 11 and 12 have lifted the lever arm 10 to provide a gap between it and the switch button 31.

Figure 6:
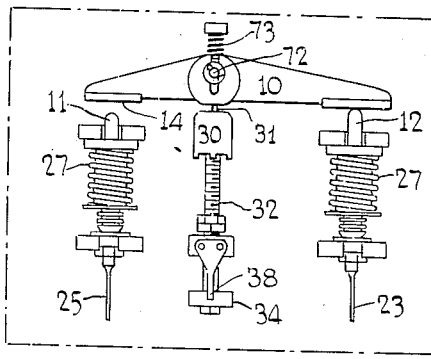

Now, should the outdoor temperature affecting the bellows 22 decrease, the bellows will contract and lower the plunger 11 so that it disengages with the end 14 of the lever 10. This permits the lever 10 to rest upon the button 31 of the switch 30 thus closing the switch to cause the delivery of heat to the inclosure, as illustrated in Figure 6.

Figure 7:
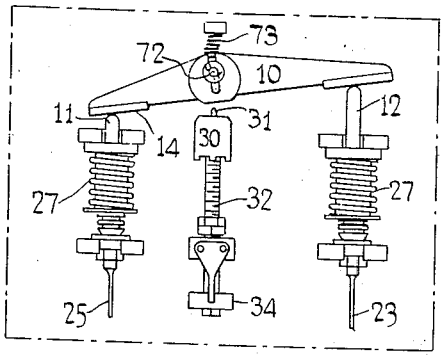

Figure 7 shows that the switch 30 will again be opened when the temperature affecting the bellows 20 is increased, that is, when the water temperature affecting the bulb 24 is high enough to call for no heat. Under this condition the bellows 20 expands causing the plunger 12 to engage the portion 16 of the lever 10 and raise the lever to open the switch 30.

Figure 8:
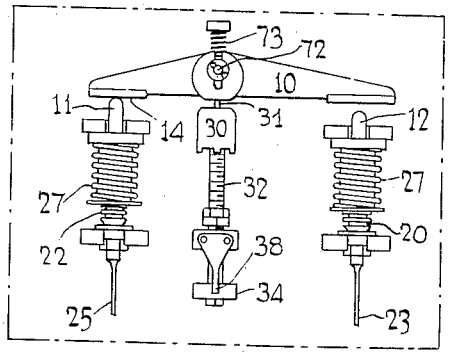

Figure 8 shows that the switch 30 will be closed if the bellows 20 contracts due to decreased temperature of the medium affecting the inside bulb 24 even though the temperature affecting expansion of the bellows 22 has risen (but not above the temperature which throws the entire heating system out of operation by control of the switch 92).

It is apparent therefore that a decrease in the temperature causing contraction of either bellows 22 or 20 will close the switch 30 while an increase in the temperature causing either bellows to expand will open the switch 30.

While our control mechanism has been illustrated in its preferred embodiment it will be readily understood that the principles of construction and operation herein described can be embodied in other forms of apparatus, and that variations in the specific form herein illustrated can be made without apparatus from the spirit of our invention or the scope of the claims hereof.

We claim:

1. In a temperature responsive control device the combination of a lever arm, a switch actuated thereby and a plurality of thermally responsive expansion elements mounted in spaced relationship with said arm and switch and having means for engaging the lever arm to change its position relative to said switch, the switch being opened or closed by changes in the position of said lever arm caused by the expansion or contraction of said thermally responsive expansion elements, and means to permit adjustment of the position of said switch and the pivot point of said lever arm simultaneously relative to said thermally responsive expansion elements.

2. In a temperature responsive control device, the combination of a lever arm, a switch actuated by the movement of said lever arm about its pivot, and a thermally responsive expansion element mounted in spaced relation with each end of said lever arm and having means to engage the ends of said lever arm to change its position relative to said switch to open or close said switch, and means to permit adjustment of the position of said switch and the pivot of said lever arm simultaneously in an infinite number of positions, relative to the position of said thermally responsive expansion elements at each end of said lever arm.

3. In a temperature responsive control device, the combination of a lever arm, a plurality of thermally responsive expansion elements mounted in spaced relation and having means to engage said lever arm to change its position, and a pressure responsive switch, said switch being mounted for actuation by said lever arm, and means to permit adjustment of the position of said switch to an infinite number of positions both horizontally and vertically relative to said thermally responsive expansion elements.

4. In a temperature responsive control device, the combination of a lever arm, two thermally responsive expansion elements mounted in spaced relation, and having means to engage said lever arm to change its position, and a pressure responsive switch mounted between said thermally responsive expansion elements, said switch being mounted for actuation by said lever arm, means to permit adjustment of the position of said switch with reference to said lever arm, and means to permit adjustment of the position of said switch and lever arm to an infinite number of positions, with reference to said thermally responsive expansion elements.

5. In a temperature responsive control device the combination of a lever arm, a plurality of thermally responsive expansion elements mounted in spaced relationship with means provided thereon for engaging the lever arm and changing its position, and a pressure responsive switch, said switch being mounted in spaced relationship with said expansion elements for actuation by said lever arm, and means to vary the spaced relationship between said switch and the expansion elements in an infinite number of positions both horizontally and vertically.

6. In a temperature responsive control device the combination of a lever arm, a thermally responsive expansion element mounted in spaced relationship with each end of said lever arm and provided with means thereon for engaging and changing the position of said lever arm, and a pressure responsive switch, said switch being mounted between said thermally responsive expansion elements for actuation by said lever arm, and means to permit lateral sliding adjustment of said switch and lever arm and the pivot point of said lever arm for continuous variation of the ratio of the lever arm from maximum to minimum.

7. In a temperature responsive control device the combination of a lever arm rotatably and vertically movable about a pivot point, a thermally responsive expansion element mounted in spaced relationship with each end of said lever arm and provided with means thereon for engaging and changing the position of said lever arm, and a switch mounted for actuation by said lever arm, and means to move said switch and lever arm and pivot point together relative to said thermally responsive expansion elements to permit innumerable variations of the relative distances between the switch and the thermally responsive expansion elements.

8. In a temperature responsive control device the combination of a lever arm rotatably and vertically movable about a fixed point, a plurality of thermally responsive expansion elements mounted in fixed spaced relationship and provided with means thereon for engaging and effecting the position of said lever arm, and a switch provided with means for actuation by said lever arm, said switch being mounted between said expansion elements and slidably adjustable to provide an unlimited number of settings, each of which varies the distances between it and the expansion elements.

9. In a temperature responsive control device the combination of a plurality of thermally responsive expansion elements, means for mounting said expansion elements in spaced relationship, a pressure responsive switch adaptable for actuating a motor, means for mounting said switch in spaced relationship with said expansion elements, means for adjusting and varying the relative distances between the switch and the expansion elements to give an unlimited number of settings, and a lever arm mounted for engagement with said expansion elements and said switch and adaptable for actuating said switch.

10. In a temperature responsive control device the combination of a plurality of thermally responsive expansion elements, means for mounting said expansion elements in spaced relationship, a switch adaptable for actuating a motor, means for mounting said switch in spaced relationship between said expansion elements, means for adjusting and varying the relative distances between the switch and the expansion elements to give an unlimited number of settings, and a lever arm mounted for engagement near each of its ends with said expansion elements and for engagement with said switch between said ends and adaptable for actuating said switch.

11. In a temperature responsive control device the combination of a lever arm and a plurality of thermally responsive expansion elements provided with means for engaging and effecting the position of the lever arm, means for mounting said expansion elements in fixed spaced relationship, a pressure responsive switch provided with means for engaging said lever arm, means for mounting said switch in spaced relationship with said expansion elements, and means for adjusting and slidably varying the position of said switch mounting to an unlimited number of positions to vary the relative distances between the lever arm engaging means of the switch and the lever arm engaging means of said expansion elements from a maximum to minimum ratio.

12. In a temperature responsive control device the combination of a plurality of thermally responsive expansion elements provided with means for engaging and effecting the position of a lever arm, a base for mounting said expansion elements in spaced relationship, a pressure responsive switch provided with means for engaging the lever arm, a lever arm mounted for engagement with the expansion elements and switch engaging means and adaptable for actuating said switch, and a support for said switch and said lever arm slidably mounted on said base adaptable for providing an infinite number of settings, each of which varies the relative distance between the switch and the fixed expansion elements.

13. In a temperature responsive control device the combination of a plurality of thermally responsive expansion elements provided with extension cylinders for engaging and effecting the position of a lever arm, a base for mounting said expansion elements in fixed spaced relationship, a switch provided with a pressure responsive button for engaging a lever arm, a lever arm mounted for engagement with the extension cylinders of said expansion elements and the pressure responsive button of said switch and adaptable for actuating said switch, and a support for said switch and lever arm slidably mounted on said base for lateral adjustment to provide an infinite number of settings, each of which varies the ratio of the relative distance between the switch and the fixed expansion elements.

14. In a temperature responsive control device the combination of a lever arm and a plurality of thermally responsive expansion elements provided with extension cylinders for engaging and effecting the position of said lever arm, a base for mounting said expansion elements in fixed spaced relationship, a switch provided with a pressure responsive button for engaging said lever arm, said lever arm being pivotally mounted for engagement with the extension cylinders of said expansion elements and the pressure responsive button of said switch and adaptable for actuating said switch, and a support for said switch and lever arm slidably mounted on said base for lateral adjustment to provide an infinite number of settings, each of which varies the ratio of the relative distance between the pivot of said lever arm and the fixed expansion elements.

15. In a temperature responsive control device the combination of a pair of thermally responsive expansion elements provided with extensions for engaging and effecting the position of a lever arm, a base for mounting said expansion elements in spaced relationship, a switch, a pressure responsive button protruding from said switch for engaging a lever arm and adapted for actuating said switch, a lever arm mounted for engagement with the extensions of said expansion elements and said pressure responsive button and adaptable for actuating said switch, a support for said switch and said lever arm slidably mounted on said base for lateral adjustments to provide an infinite number of laterally spaced settings for said support, and a screw mounted on said support for adjusting the height of said pressure responsive button.

FERDINAND JEHLE.
AUSTIN O. ROCHE, Jr.